United States Patent
Schreyer et al.

(10) Patent No.: US 7,363,036 B2
(45) Date of Patent: Apr. 22, 2008

(54) PROCEDURE FOR REGISTERING A NEW SUBSCRIBER IN A RADIO SYSTEM THROUGH ROUTERS

(75) Inventors: Karlheinz Schreyer, Wolfratshausen (DE); Werner Schropp, München (DE)

(73) Assignee: Siemens Aktiengesellschaft, Munich (DE)

( * ) Notice: Subject to any disclaimer, the term of this patent is extended or adjusted under 35 U.S.C. 154(b) by 66 days.

(21) Appl. No.: 10/824,800

(22) Filed: Apr. 15, 2004

(65) Prior Publication Data
US 2005/0003815 A1   Jan. 6, 2005

(30) Foreign Application Priority Data
Apr. 17, 2003   (DE) ................. 103 17 962

(51) Int. Cl.
*H04Q 7/20* (2006.01)
(52) U.S. Cl. .................. 455/435.1; 455/41.2; 455/455
(58) Field of Classification Search ......... 455/414.1–2, 455/415, 445, 41.2, 428, 434, 512, 513, 437, 455/425, 435.1; 370/242, 279
See application file for complete search history.

(56) References Cited

U.S. PATENT DOCUMENTS

| | | | | |
|---|---|---|---|---|
| 4,363,031 A | | 12/1982 | Reinowitz | 340/539 |
| 4,534,061 A | * | 8/1985 | Ulug | 455/17 |
| 4,641,127 A | | 2/1987 | Hogan et al. | 379/40 |
| 5,465,081 A | | 11/1995 | Todd | 340/825.05 |
| 5,771,463 A | * | 6/1998 | Lehmusto et al. | 455/524 |
| 5,781,860 A | * | 7/1998 | Lopponen et al. | 455/426.1 |
| 5,822,682 A | * | 10/1998 | Schroderus et al. | 455/63.3 |
| 5,907,794 A | * | 5/1999 | Lehmusto et al. | 455/11.1 |
| 5,983,072 A | * | 11/1999 | Schroderus | 455/11.1 |
| 5,995,849 A | * | 11/1999 | Williams et al. | 455/555 |
| 6,055,429 A | * | 4/2000 | Lynch | 455/445 |
| 6,097,703 A | * | 8/2000 | Larsen et al. | 370/254 |
| 6,230,015 B1 | * | 5/2001 | Kinnunen et al. | 455/450 |
| 6,252,859 B1 | * | 6/2001 | Rhodes et al. | 370/329 |
| 6,405,033 B1 | * | 6/2002 | Kennedy et al. | 455/414.1 |

(Continued)

FOREIGN PATENT DOCUMENTS

| | | |
|---|---|---|
| DE | 3337648 A1 | 2/1987 |
| EP | 0833288 A2 | 4/1998 |
| EP | 0911775 A2 | 4/1999 |
| EP | 1 119 837 B1 | 2/2004 |
| GB | 2222288 | 2/1990 |

(Continued)

OTHER PUBLICATIONS

Communication from the European Patent Office, 3 pages.
International Search Report for PCT/US99/23386, 1 page.

*Primary Examiner*—William Trost
*Assistant Examiner*—Diego Herrera
(74) *Attorney, Agent, or Firm*—Baker Botts L.L.P.

(57) ABSTRACT

On registration of a new subscriber in a radio system with a central system and a plurality of subscribers the new subscriber first sends a search telegram to all the subscribers that it can reach in its radio range and selects from the subscribers that respond a first router. Via this router it sends a registration request in the form of a message with a provisional own address to the central system. If it accepts the registration request the central system sends a response telegram via the router which contains a subscriber number and a system identifier for the new subscriber, which is integrated when the subscriber number is accepted into the radio system.

21 Claims, 3 Drawing Sheets

U.S. PATENT DOCUMENTS

| | | | |
|---|---|---|---|
| 6,456,613 B1 * | 9/2002 | Kato | 370/347 |
| 6,473,617 B1 * | 10/2002 | Larsen et al. | 455/446 |
| 6,690,657 B1 * | 2/2004 | Lau et al. | 370/315 |
| 6,704,301 B2 * | 3/2004 | Chari et al. | 370/351 |
| 7,039,445 B1 * | 5/2006 | Yoshizawa | 455/575.7 |
| 2001/0031637 A1 * | 10/2001 | Suzuki | 455/435 |
| 2001/0055982 A1 * | 12/2001 | Umeda | 455/560 |
| 2002/0055333 A1 * | 5/2002 | Davies et al. | 455/41 |
| 2002/0058504 A1 * | 5/2002 | Stanforth | 455/426 |
| 2002/0102974 A1 * | 8/2002 | Raith | 455/434 |
| 2004/0203765 A1 * | 10/2004 | Das et al. | 455/435.1 |

FOREIGN PATENT DOCUMENTS

| | | |
|---|---|---|
| GB | 2319373 | 5/1998 |
| WO | 92/22883 | 12/1992 |
| WO | 94/03881 | 2/1994 |
| WO | 00/21053 | 4/2000 |
| WO | 00/52658 | 9/2000 |
| WO | 01/15112 | 3/2001 |

* cited by examiner

PROCEDURE FOR REGISTERING A NEW SUBSCRIBER IN A RADIO SYSTEM THROUGH ROUTERS

PRIORITY

This application claims foreign priority to German application number DE10317962.3 filed Apr. 17, 2003.

TECHNICAL FIELD

The invention relates to a method for registering a new subscriber in a radio system of an alarm installation with a control center and a plurality of subscribers in one or more radio cells, in which case the central system and the subscribers each have a transmission device and a receiving device or can make radio contact indirectly via one or more other subscribers acting as routers.

BACKGROUND OF THE INVENTION

Alarm systems in which messages are transferred via radio offer many advantages over wired networks. In particular the effort of installing these types of network is saved and the individual subscribers can be flexibly arranged and moved around at any locations. The alarm systems include alarm sensors as subscribers or ancillary stations which, in the event of danger being detected, e.g. fire or intrusion, communicate via a radio connection with a central system in which further measures are initiated to remedy the danger, such as signaling alarms to the fire service or the police.

An alarm system is known from WO 92/22883 in which the battery-operated fire alarm and intruder alarm use a radio link to transmit their address, the data measured by the fire or intrusion detector as well as data about the remaining energy of the batteries, to a central system. Such unidirectional systems, although low-cost designs, are however only suitable for systems where the risks are low. To save energy, detectors in such systems are only equipped with one transmitter and only report at infrequent intervals, for example every 24 hours, to the central system. They are not in a position to explicitly search for free radio channels in order to guarantee transmission even if a radio channel is busy.

Since the detectors cannot receive acknowledgements, error-free transport of information cannot be ensured.

Compared to such unidirectional systems, it is possible to significantly increase the security of transmission in radio alarm systems. However a receiver section increases the costs, the unit itself is larger and consumes more energy than a pure transmitter. An alarm system is known from EP 911 775 for example which is a bidirectional system and for which the components are designed to save energy. Faults in this type of system can be securely detected in less than 100 seconds; however what are known as fading holes can lead to unnecessary fault messages. Additional mechanisms are needed to resolve the problem.

Where each subscriber has to establish direct connection with the central system a relatively high transmit power is required for individual subscribers. Therefore in terms of energy consumption what are known as routing systems are better in which subscribers further away can use other subscribers as routers, referred to as routers to make the radio connection to the central system. Thus a method for radio transmission in an alarm system is known from EP 833 288 in which the measured data of an alarm sensor can be transmitted via other alarm sensors as routers to the central system if there is no direct connection to the central system because the radio coverage is too small or if it is disturbed in some way. A time variant hierarchical connection structure between the alarm sensors is provided for this.

To be able to react in a flexible way in such bidirectional systems with flexible routing options to faults in radio traffic and changes in the subscriber structure and to always ensure secure connections it is necessary in such a system for the fact that a subscriber belongs to this system to be known to all other subscribers. This would be possible by using the serial number of a detector as an identification which is known to all other subscribers so that it only allows the known subscribers to take part in data traffic. The disadvantage here however is that such a serial number is relatively long and therefore takes up relatively large amounts of space in the individual subscribers. In addition each time that a new subscriber registers their identification or serial number must be notified to all the others, which takes a very long time and places a significant load on the radio channel. If in addition, the registration of a detector is also to be possible via a number of subscribers the cell identification, that is the serial number, must be entered beforehand since the radio cell information of subscribers not yet registered cannot be transmitted. The setting necessary for this can only be made manually and is therefore relatively prone to error. Such errors in the identification number can also barely be recognized during commissioning.

SUMMARY OF THE INVENTION

The object of the invention is therefore to specify a method for a system of the type mentioned at the start with which new subscribers can be quickly registered in the system and when this is done only a relatively small load is imposed on the relevant radio interfaces, with a minimum of storage space being needed for this purpose in the individual subscribers.

In accordance with the invention therefore a new subscriber is registered in a radio system of the type mentioned above by using the following steps:
- the new subscriber sends a search signal to all subscribers that can be reached and selects from the responding subscribers a first router,
- the new subscriber sends to the first router a registration request in the form of a message which contains a provisional address and the central system assigned to the first router as the destination entry,
- as soon as the registration request has been forwarded from the first router to the central system, the central system decides whether to accept or reject the registration request, and
- upon acceptance, the central system sends a response containing a subscriber signal and a system identifier directly or via routers, which is then accepted and stored by the new subscriber.

With the method in accordance with the invention a radio component that would like to become a subscriber initially establishes contact with any other subscriber and instructs it to transmit a connection request to the central system. In this process, it makes no difference whether the data traffic is occurring directly with the central system or via other subscribers of the system. Only a minimum of storage space is required in the subscribers in this case since the system works with a system identity or cell identity which is the same in all subscribers. During the commissioning phase, the data traffic remains very low since, except for the central device and the subscribers to be registered, all other subscribers remain in their normal operating mode.

For a registration process, the temporary address of the new subscriber is handled in relation to the routing mechanism in exactly the same way as a unique address. On the path of the message to the central system, which can pass through a number of routers, the individual stations will be marked so that the return message from central system to the registering subscriber can return on the same path. This is done either by collecting the detectors passed in the telegram or by an identification of the subscribers passed through in order to allow routing with distributed lists.

In a further embodiment of the method in accordance with invention there is provision, if the registration request is rejected by the central system, for the new subscriber to choose another first router and to send a registration request via the station to the central system. A subscriber is rejected, for example, if it should not belong to the radio system with which it is attempting to register or if the central system does not accept the subscriber for other reasons, for example, if capacity grounds dictate that no additional subscribers are to be accepted.

According to one embodiment of the invention, the subscriber to be registered makes contact in two steps. It first sends a search telegram to all radio partners that can be reached, which can belong under some circumstances to different radio systems or radio cells. From the responding subscribers, it selects one and then sends its registration request to the central system via this subscriber. To avoid collisions, a non-directed search request (broadcast request) to each possible subscriber of a radio system is assigned a fixed time slot which does not overlap with others.

In an advantageous embodiment of the method in accordance with the invention there is further provision, after the new subscriber has sent its search signal, for all subscribers located within a radio range to send this subscriber a response telegram with their address and an identification of their radio system, for the new subscriber to store the addresses and the associated system identification in a list of potential routers, for which it defines the sequence in a prespecified evaluation algorithm, and that the new subscriber selects its first router from the list in accordance with its order and if its registration request is rejected by the radio system of the first routers, it selects a further router for a new transmission of the registration request in accordance with the prespecified sequence of the list. To determine the sequence of the list of potential routers the strength of the relevant response signal is a deciding factor for example. Other evaluation criteria can involve checking initially whether the central system itself is responding; in this case the central system can be placed first in the list. The number of hierarchical stages between a central system and the subscribers responding in each case can also be a factor for the sequence; finally the cell number or system number of the responding subscriber can be taken into account.

After a successful registration of the new subscriber with the central system there is provision in a further embodiment of the invention for the new subscriber to send out a second search signal to all subscribers located within radio range and then to inform the central system about all the subscribers of the radio system concerned which can be reached within its radio range. In this case it can also indicate the field strength with which it can receive the individual subscribers. The central system can use this to create a system configuration for optimum transmission of messages via routers and notify the radio systems subscribers about this.

BRIEF DESCRIPTION OF THE DRAWINGS

The invention is explained below in more detail on the basis of an exemplary embodiment. The Figures show FIG. 1 a schematic configuration of two adjacent radio systems between which a new subscriber is attempting to register, FIGS. 2 to 6 a schematic diagram of the further steps in the registration of the new subscriber in one of the radio systems and FIG. 7 a registration request from the new subscriber in this second radio system after a rejection in the first radio system.

DETAILED DESCRIPTION OF THE PREFERRED EMBODIMENTS OF THE INVENTION

Figure 1:
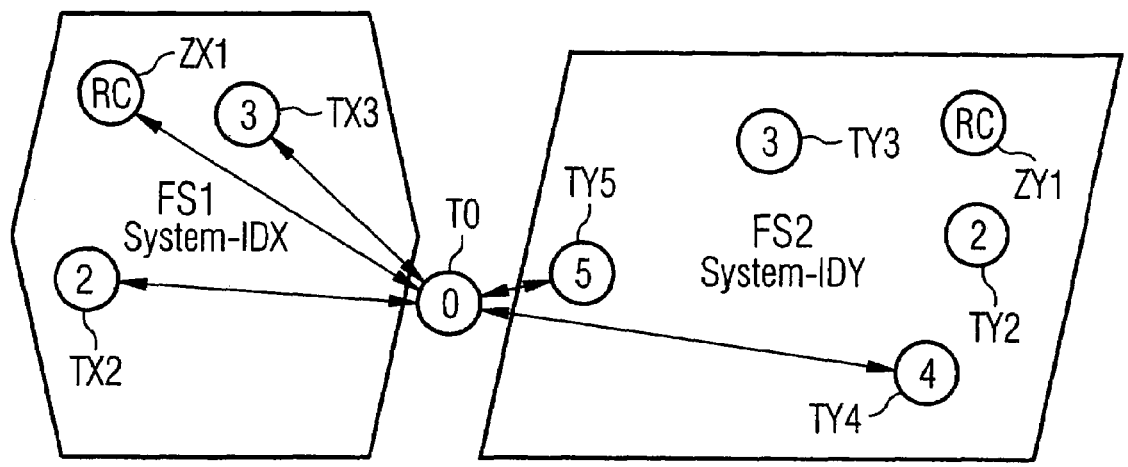

FIG. 1 shows a schematic diagram of two adjacent radio systems, namely a radio system FS1 with a system identifier X and a radio system FS2 with a system identifier Y. Radio system FS1 contains for example a central system ZX1 and the subscribers TX2 and TX3, whereas radio system FS2 features a central system ZY1 as well as further subscribers TY2, TY3, TY4 and TY5. A radio component T0 attempts to register itself as a new subscriber in one of the two radio systems.

Figure 2:
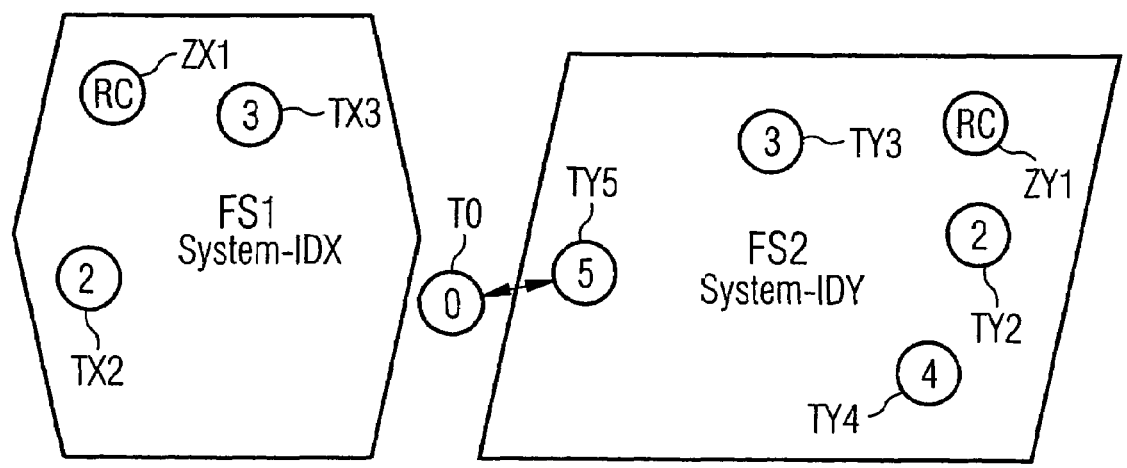

To this end the new subscriber T0 first sends a broadcast telegram to all the subscribers of the two radio systems that it can reach. FIG. 1 shows the subscribers which have received a search telegram and responded to it, linked to subscriber T0 via arrows. The registering subscriber T0 now knows all potential routers that are reachable and stores their addresses as well as their system identifiers X or Y in each case. In accordance with an evaluation algorithm described above it creates a list of potential routers and selects the subscriber at the top of the list as its point of contact. In the example shown at the subscriber TY5 is to be this first partner serving as an router since it is closest to subscriber T0 and therefore would be able to receive its response signal from the latter most strongly. The new subscriber T0 thus sends its registration request to the subscriber TY5, as shown in FIG. 2.

Figure 3:
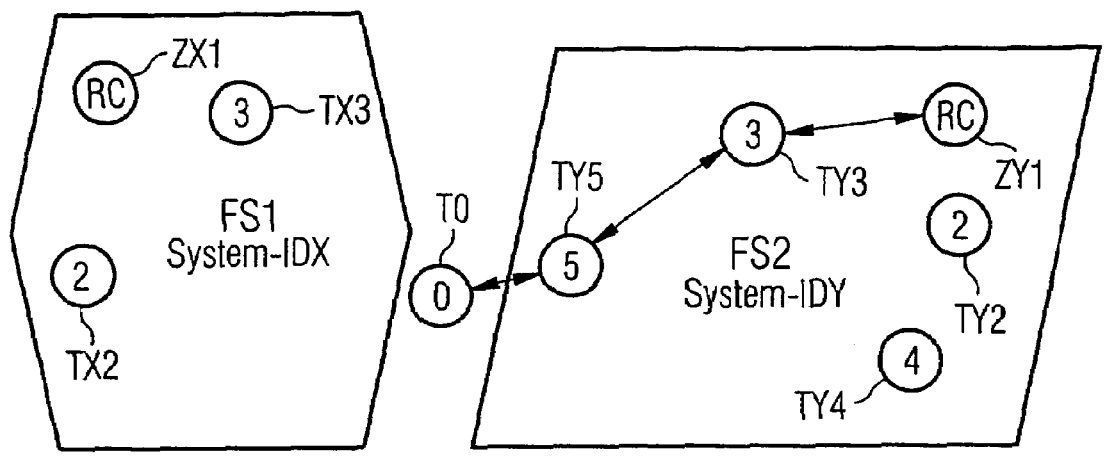
Figure 4:
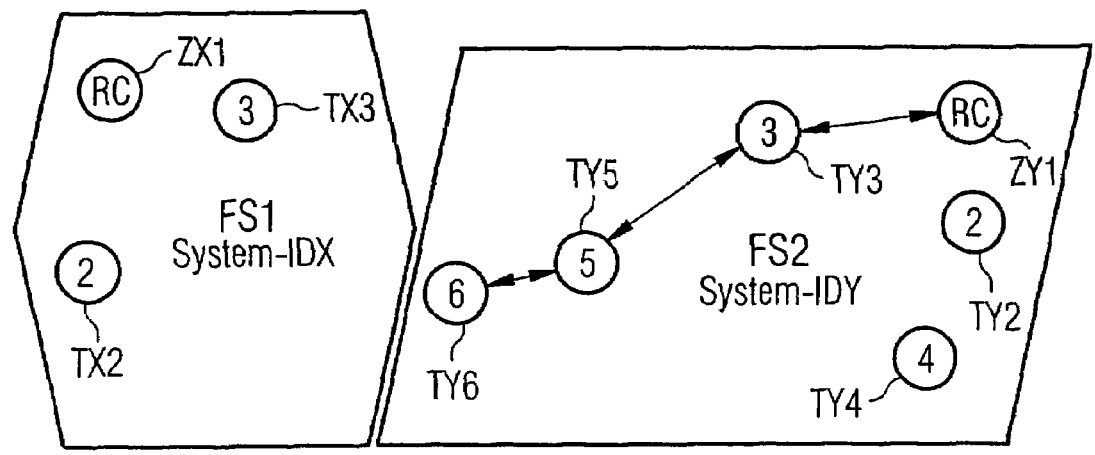

FIG. 3 shows how the registration request of the new subscriber T0 is forwarded via the subscribers TY5 and TY3 as a further router to the central system ZY1. The radio connections which are established in this case are shown by a double arrow. When the new subscriber is accepted by a central system ZY1 the central system sends a response telegram over the same path, in which it notifies the new subscriber of its subscriber number TY6 and the system identification Y. As is shown in FIG. 4 this new subscriber TY6 is now integrated into the radio system FS2.

Figure 5:
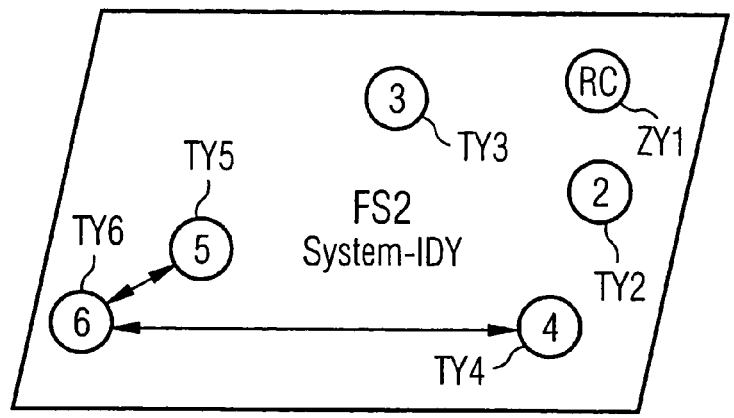

The new subscriber TY6 now sends a search telegram again to all subscribers that can be reached, but only to those subscribers belonging to its own radio system FS2, and waits for their response. According to FIG. 5 these are subscribers TY4 and TY5 in the same radio system FS2. The new subscriber TY6 now uses the same path as shown in FIG. 3 and FIG. 4 to notify the central system ZY1 about which subscribers it can receive and the field strength with which it is receiving their signals.

Figure 6:
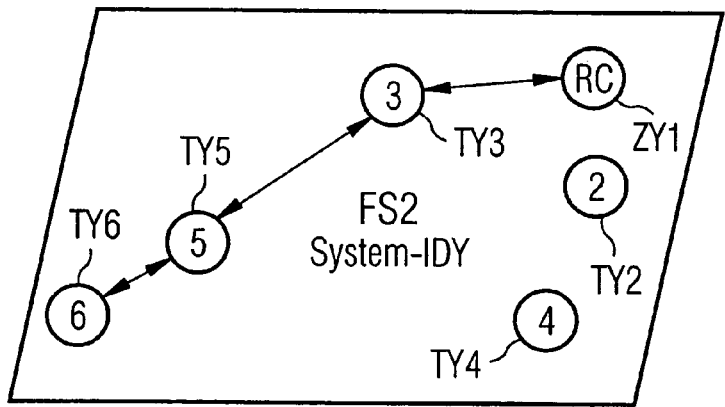
Figure 7:
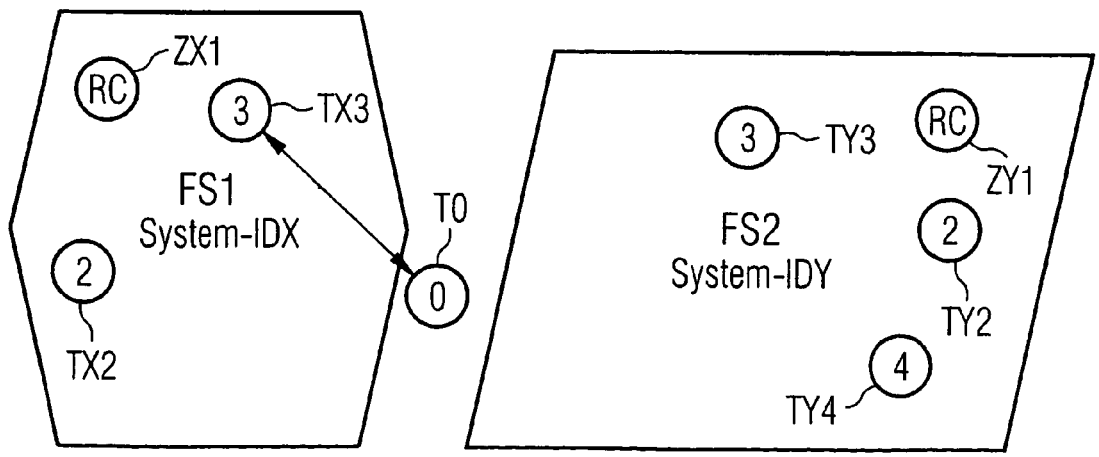

If however at this stage of the notification process already shown in FIG. 3 the central system ZY1 has notified the new subscriber T0 of its rejection, the new subscriber T0, as shown in FIG. 7, selects from its list of potential routers the next entry in the list, namely subscriber TX3 in radio system FS1. It then completes the registration process in radio system FS1 in the same way as has already been described on the basis of FIGS. 4 to 6 for radio system FS2.

What is claimed:

1. A method for registering a new subscriber in a radio system having a central system and a plurality of subscribers, said central system and said subscribers comprise a transmission and a receiving device, said subscribers can establish direct radio contact with the central system or indirect contact via one or more other subscribers as routers, said method for registering comprising the following steps:
a new subscriber sending a search signal to all subscribers that can be reached and selecting a first router from subscribers that respond;
the new subscriber sending a registration request to the first router in the form of a message, said message contains a provisional address and an identifier of the central system assigned to the first router;
after the registration request from the first router has been forwarded to the central system, the central system deciding whether to accept or reject the registration request, and
if accepted, the central system sending a response via the first router which contains a subscriber number and a system identifier which is accepted and stored by the new subscriber,
wherein if the registration request is rejected by the central system, the new subscriber selecting another first router of another radio cell and sending a registration request via this router to its central system, and
wherein the new subscriber, after a successful registration, sending out a second search signal to all subscribers located within its radio range and subsequently informing the central system about all subscribers that can be reached in its radio range of radio system.

2. A method in accordance with claim 1, wherein after the new subscriber sending the search signal and the subscribers located within range respond by sending their address and an identifier of their system to the new subscriber, the new subscriber stores the addresses and the associated system identifications in a list of potential routers, for which it defines the order in accordance with a prespecified evaluation algorithm, and the new subscriber selecting its first router from the list in accordance with its order and if its registration request is rejected by the system of the first router, selecting a further router in each case in accordance with the prespecified order of the list for sending the registration request again.

3. A method in accordance with claim 2, wherein the new subscriber defines the order of potential routers on its list in accordance with the strength of the response signal.

4. A method in accordance with claim 2, wherein the new subscriber first checks whether a central system is responding to its search signal and that in this case it puts the central system at the top of its list.

5. A method in accordance with claim 2, wherein the new subscriber defines for the order of its list of potential routers how many hierarchy stages away each responding system is from its central system.

6. A method in accordance with claim 2, wherein the new subscriber evaluates the system identifiers of the responding subscribers for the order of its list.

7. A method in accordance with claim 1, wherein the new subscriber notifies the central system about the field strength with which it is receiving the signals from the subscribers that it can reach, and the central system creates from this data an optimum system configuration for transmission of messages via routers and notifies the subscribers of the radio system of this configuration.

8. A method in accordance with claim 1, wherein the signals of the new subscriber in each case with their provisional address, are forwarded in precisely the same way as the telegrams with a unique address, in which case on the way to the central system the routers of the subscribers through which the messages pass are marked so that the response from the central system to the registering subscriber travels back on the same path.

9. A method in accordance with claim 8, wherein the subscribers through which the messages pass are marked by collecting their relevant addresses in the forwarded telegram.

10. A method in accordance with claim 8, wherein the subscribers through which the messages pass are marked by an identifier which allows routing with distributed lists.

11. A method for registering a new subscriber in a radio system having a central system and a plurality of subscribers, said central system and said subscribers comprise a transmission and a receiving device, said subscribers can establish direct radio contact with the central system or indirect contact via one or more other subscribers as routers, said method for registering comprising the following steps:
a new subscriber sending a search signal to all subscribers that can be reached and selecting a first router from subscribers that respond;
the new subscriber sending a registration request to the first router in the form of a message, said message contains a provisional address and an identifier of the central system assigned to the first router;
after the registration request from the first router has been forwarded to the central system, the central system decides whether to accept or reject the registration request, and
if accepted, the central system sending a response via the first router which contains a subscriber number and a system identifier which is accepted and stored by the new subscriber,
wherein the new subscriber, after a successful registration, sending out a second search signal to all subscribers located within its radio range and subsequently informing the central system about all subscribers that can be reached in its radio range of radio system.

12. A method in accordance with claim 11, wherein after the new subscriber sending the search signal and the subscribers located within range respond by sending their address and an identifier of their system to the new subscriber, the new subscriber storing the addresses and the associated system identifications in a list of potential routers, for which it defines the order in accordance with a prespecified evaluation algorithm, and the new subscriber selecting its first router from the list in accordance with its order and if its registration request is rejected by the system of the first router, selecting a further router in each case in accordance with the prespecified order of the list for sending the registration request again.

13. A method in accordance with claim 12, wherein the new subscriber defines the order of potential routers on its list in accordance with the strength of the response signal.

14. A method in accordance with claim 12, wherein the new subscriber first checks whether a central system is responding to its search signal and that in this case it puts the central system at the top of its list.

15. A method in accordance with claim 12, wherein the new subscriber defines for the order of its list of potential routers how many hierarchy stages away each responding system is from its central system.

16. A method in accordance with claim 12, wherein the new subscriber evaluates the system identifiers of the responding subscribers for the order of its list.

17. A method in accordance with claim 11, wherein the new subscriber notifies the central system about the field strength with which it is receiving the signals from the subscribers that it can reach, and the central system creates from this data an optimum system configuration for transmission of messages via routers and notifies the subscribers of the radio system of this configuration.

18. A method in accordance with claim 11, wherein the signals of the new subscriber in each case with their provisional address, are forwarded in precisely the same way as the telegrams with a unique address, in which case on the way to the central system the routers of the subscribers through which the messages pass are marked so that the response from the central system to the registering subscriber travels back on the same path.

19. A method in accordance with claim 18, wherein the subscribers through which the messages pass are marked by collecting their relevant addresses in the forwarded telegram.

20. A method in accordance with claim 18, wherein the subscribers through which the messages pass are marked by an identifier which allows routing with distributed lists.

21. A method in accordance with claim 11, wherein if the registration request is rejected by the central system, the new subscriber selecting another first router of another radio cell and sending a registration request via this router to its central system.

* * * * *